United States Patent Office 3,816,400
Patented June 11, 1974

3,816,400
2'-o-METHYLADENOSINE 3',5'-CYCLIC PHOSPHATE
Dennis A. Shuman, Mission Viejo, and Roland K. Robins, Santa Ana, Calif., assignors to International Chemical & Nuclear Corporation, Pasadena, Calif.
No Drawing. Filed Nov. 22, 1971, Ser. No. 201,158
Int. Cl. C07d 51/54
U.S. Cl. 260—211.5 R          1 Claim

ABSTRACT OF THE DISCLOSURE

2'-o-Methyladenosine 3',5'-cyclic phosphate is prepared by selective phosphorylation of 2'-o-Methyladenosine, followed by dicyclohexylcarbodiimide cyclization. The compound is a potent phosphodiesterase inhibitor.

BACKGROUND AND SUMMARY OF THE INVENTION

As reported by Sutherland et al. in "Cyclic AMP" Am. Rev. Biochem 37, 149 (1968), cyclic adenosine monophosphate (cyclic-AMP) has been established as an intracellular "second messenger" mediating many of the actions of a variety of different hormones. According to the second messenger theory, first messenger hormones influence adenyl cyclose contained at or within cell walls to intracellularly form cyclic-AMP from adenosine triphosphate upon receipt of the extra-cellular hormone signal. The formed cyclic-AMP in turn stimulates intracellular functions particular to the target cells of the hormone. Cyclic-AMP has been shown to "activate" protein kinases which in turn occasion physiological effects such as muscle contraction, glycogenolysis, steroidogenisis and lipolysis. However, cyclic-AMP is degraded in vivo by phosphodiesterase enzymes which catalyze hydrolysis of the cyclic purine nucleotide to 5'-adenosine monophosphate with consequent loss of function. It would accordingly be advantageous, then, to enhance the beneficial effects of naturally produced cyclic-AMP by securing and administering phosphodiesterase inhibitors.

We have now found that the novel 2'-o-methyl analog of cyclic-AMP is itself a potent phosphodiesterase inhibitor.

DETAILED DESCRIPTION OF THE INVENTION

As appears in greater detail from the Example of the preferred preparation which follows, the compound of the invention (III) is obtained by selective phosphorylation of 2'-o-methyladenosine to obtain the 5'-monophosphate II, which is then cyclized with dicyclohexylcarbodiimide, viz:

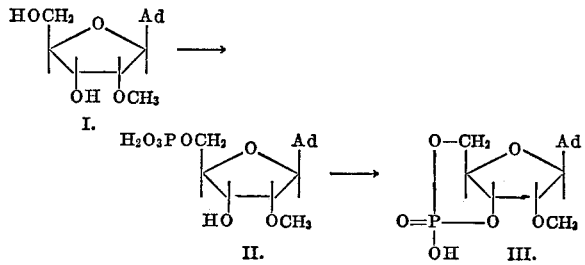

EXAMPLE I

Preparation of 2'-o-Methyladenosine 3',5'-Cyclic Phosphate

2'-o-Methyladenosine (1.0 g., 35.6 mmoles) was stirred in 9 ml. trimethylphosphate at ice bath temperature and 0.70 ml. phosphorus oxychloride was added. After 90 min. triethylammonium bicarbonate (0.5 M) was added to the reaction mixture until the pH reached 7.5. The solution was concentrated and any crystals which had formed were filtered. The filtrate was evaporated in vacuo and the resulting solid residue was dissolved in 15 ml. water and applied to a Whatman DE52 cellulose column (HCO₃⁻ form, 11" x 2½"). Elution with a gradient of 3 liter water-3 liter 0.5 M triethylammonium bicarbonate gave after evaporation of the appropriate fractions 1.36 g. of 2'-o-methyladenosine-5'-phosphate triethylammonium salt. An electrophoresis in phosphate buffer (pH 7.2) showed this compound to be homogenous with a mobility identical to that of adenosine-5'-phosphate. 2'-o-Methyladenosine-5'-phosphate triethylammonium salt (1.36 g.) and 4-morpholine-N,N-dicyclohexylcarboxamidine (0.87 g.) were dissolved in 75 ml. pyridine and 15 ml. water. The solution was evaporated and azeotroped with pyridine. The resulting glass was dissolved in 300 ml. pyridine and was added dropwise to a refluxing solution of 1.25 g. dicyclohexylcarbodiimide in 300 ml. pyridine over one hour. The solution was refluxed an additional 2 hours and then 10 ml. water added and the solution evaporated to dryness. The residue was partially dissolved in water, filtered and the filtrate evaporated. The residue was dissolved in 0.5 M triethylammonium bicarbonate, concentrated, and added to a DE52 cellulose column (HCO₃⁻ form, 12" x 2½"). Elution with a gradient of 3 liter water-3 liter 0.5 M triethylammonium bicarbonate gave after evaporation of the proper fractions 0.72 g. of 2'-o-methyladenosine-3',5' cyclic phosphate. This compound was dissolved in 20 ml. water and the pH adjusted to 2 with concentrated hydrochloric acid; addition of ethanol gave the crystalline form. An electrophoresis of the compound (pH 7.2 phosphate buffer) showed it to be homogenous with a mobility identical to that of adenosine-3',5'-cyclic phosphate.

EXAMPLE II

Phosphodiesterase Assay

Cat heart cyclic 3',5' - nucleotide phosphodiesterase (PDE) was partially purified by a modification of the procedure of Brooker et al., Biochem. 7, 4177. A 1- to 2-kg. mongrel cat was sacrificed by cervical dislocation. The cat heart was immediately placed on cracked ice, and the following steps were carried out at 0–4° C. The organ was minced and homogenized in 5 to 10 volumes of 0.05 M imidazole buffer (pH 7.5), also containing 5 mM. dithiothreitol. The homogenate was immediately centrifuged for 15 to 20 minutes at 39,000 X g. The supernatant fraction was adjusted to 50% saturation with ammonium sulfate, the pH adjusted to 7.5 with 1 N NaOH, and the mixture was allowed to stand for 1 hour. The solution was again centrifuged as before, then the precipitate taken up in the smallest possible volume of the imidazole buffer and dialyzed against 20 volumes of the buffer. Protein concentration was from 5 to 7 mg./ml. for cat heart PDE. The enzyme preparation was stored at 0–4° C. until used.

The hydrolysis of cyclic AMP at concentrations close to physiological levels was measured, in at least duplicate, by a modification of the radioactive assay described by Brooker et al. supra. We adapted this procedure so that PDE activity could be monitored in the presence of potential inhibitors. Briefly, 50 µl. of a solution of $^3$H-cyclic AMP (0.17 µm.) as substrate, 50 µl. of an aqueous solution of inhibitor and 50 µl. of PDE solution containing human serum albumin (1 mg./ml.) and an excess of snake venon nucleotidase (1 mg./ml.) were incubated in a plastic liquid scintillation vial for 10 minutes at 37° C. The $^3$H-cyclic AMP was converted to $^3$H-5'AMP by PDE. The $^3$H-5'-AMP, in turn, was converted to $^3$H-adenosine by the nucelotidase. The reaction was stopped by the addition of an anion exchange resin, which adsorbed unchanged $^3$H-cyclic AMP, and left $^3$H-adenosine in solution. Only $^3$H-adenosine was counted after the addition of scintillation fluid, due to quenching by the resin of the radiation from adsorbed $^3$H-cyclic AMP. The 2'-o-methyladenosine 3',5'-cyclic phosphate, in 9.4 micromolar concentration, caused 50 percent inhibition of enzymatic activity, demonstrating the compound to be a potent phosphodiesterase inhibitor.

We claim:

1. 2'-o-methyladenosine 3',5'-cyclic phosphate.

References Cited

UNITED STATES PATENTS

| | | | |
|---|---|---|---|
| 3,225,029 | 12/1965 | Yamaoka | 260—211.5 R |
| 3,627,753 | 12/1971 | Posternak et al. | 260—211.5 R |

OTHER REFERENCES

Smith, "Jour. Amer. Chem. Soc.," vol. 83, pp. 698–699, 1961.

JOHNNIE R. BROWN, Primary Examiner

U.S. Cl. X.R.

424—180